United States Patent [19]
Wise et al.

[11] Patent Number: 5,406,485
[45] Date of Patent: Apr. 11, 1995

[54] METHOD AND APPARATUS FOR DETECTING FAULTY OPERATION OF A WHEEL SPEED SENSOR

[75] Inventors: William D. Wise, Flora; Brian W. Schousek, Kokomo, both of Ind.

[73] Assignee: Delco Electronics Corp., Kokomo, Ind.

[21] Appl. No.: 149,498

[22] Filed: Nov. 9, 1993

[51] Int. Cl.$^6$ .................... G06F 15/20; B60T 8/88
[52] U.S. Cl. .................... 364/426.02; 364/551.01; 303/92; 303/94
[58] Field of Search .............. 364/426.02, 426.04, 364/424.03, 424.04, 431.12, 551.01, 565, 571.01, 483; 324/161; 280/735; 303/92, 94, 100, 102, 106

[56] References Cited

U.S. PATENT DOCUMENTS

| | | | |
|---|---|---|---|
| 4,013,324 | 3/1977 | Quon | 303/92 |
| 4,219,244 | 8/1980 | Grinner et al. | 303/92 |
| 4,233,599 | 11/1980 | Brearley | 303/92 |
| 4,270,808 | 6/1981 | Brearley | 303/92 |
| 4,270,809 | 6/1981 | Ohmori et al. | 303/92 |
| 4,409,664 | 10/1983 | Skarvada | 364/565 |
| 4,720,794 | 1/1988 | Skarvada | 364/426.02 |
| 4,836,616 | 6/1989 | Roper et al. | 303/92 |
| 4,928,242 | 5/1990 | Suzuki | 364/424.03 |
| 4,947,325 | 8/1990 | Iwata et al. | 364/424.03 |
| 5,058,019 | 10/1991 | Litkouhi | 364/426.02 |
| 5,074,626 | 12/1991 | Kramer et al. | 364/426.02 |
| 5,234,261 | 8/1993 | Leyes et al. | 364/426.02 |
| 5,253,173 | 10/1993 | Drobny et al. | 364/424.05 |

*Primary Examiner*—Kevin J. Teska
*Assistant Examiner*—Tan Nguyen
*Attorney, Agent, or Firm*—Mark A. Navarre

[57] ABSTRACT

Faulty operation of a two-lead wheel speed sensor in a vehicle control system is detected and distinguished from transients by measuring a common mode voltage of the sensor and applying such voltage to a window comparator. Analog-to-digital conversion circuitry for capturing wheel speed signals is disabled so long as the measured voltage falls outside the comparator window. When the measured voltage is outside the comparator window for at least a given time limit, an open circuit fault condition is indicated. Additionally, the sensor lead voltages are compared to threshold voltages; when both voltages exceed the thresholds for at least a given time limit, a short circuit fault condition is indicated. The windows, thresholds and time limits are programmable by the vehicle control system computer.

11 Claims, 3 Drawing Sheets

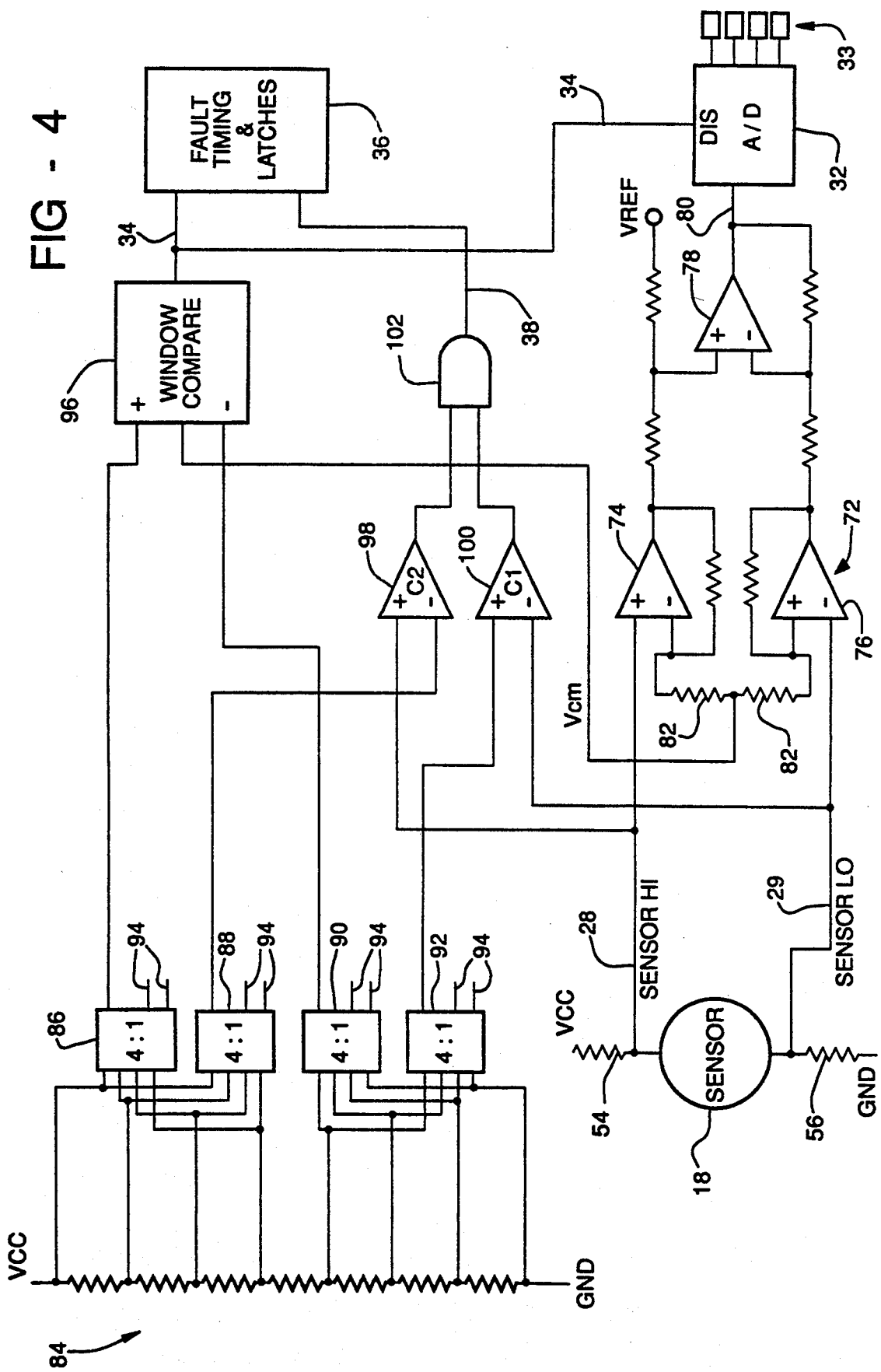

METHOD AND APPARATUS FOR DETECTING FAULTY OPERATION OF A WHEEL SPEED SENSOR

FIELD OF THE INVENTION

This invention related to processing signals from variable reluctance sensors and particularly to a method and apparatus for diagnosing faults or intercepting transients in signals from variable reluctance sensors.

BACKGROUND OF THE INVENTION

It is known in automotive vehicle control systems to utilize wheel speed information which is processed in a computer for operating a control such as anti-lock brakes or traction control. Frequently the wheel speed of all four wheels or of both front wheels and the average of the rear wheels are used for control purposes. In such cases three or four variable reluctance wheel speed sensors are fed to the computer control, each sensor having a separate channel for processing the wheel speed. The processing may include sensor and channel diagnostics, amplification, square wave generation, A/D conversion, and determination of each wheel speed. At some point in the process the signals are digitized and fed to the computer.

To the extent that the channels are separate, it is relatively easy for the computer to diagnose faulty operation in a sensor or channel: when the wheel speeds are expected to be equal, the channel outputs are compared and any deviant channel has an output different from the others. Verifying the processing occurring within the computer is more difficult. It has been proposed to use two microprocessors running in parallel so that one can be a check for the other. However, such large scale redundancy is expensive in terms of the amount of space required on a computer die.

To upgrade anti-lock brakes and traction control systems, it is here proposed to include on the computer die functions which previously have been accomplished separately. Yet because of the need to conserve space on the silicon die, the processing must be done efficiently and in some cases with less circuitry than used in more conventional systems. One feature is to multiplex the incoming sensor signals and process the signals through only one channel instead of three or four. This presents some challenges, for example, diagnostics of the external sensors, harnesses and processing channel no longer can rely on comparing one channel to another. New diagnostics, then, are needed not only for external circuits but for internal operations. An advantage to incorporating the input functions on the same die as the computer is that the computer is readily available for assisting with some of the processing or the diagnostics, affording some amenities not previously practical.

At the outset, it is important to assure the integrity of the input signals which may be affected by shorts or open circuits in the sensors or the sensor harness or by noise introduced by the environment.

SUMMARY OF THE INVENTION

It is therefore an object of the invention to test the input signals form the sensors to detect faults and noise. It is another object to distinguish between faults and transients and to respond appropriately to each.

The system which embodies the invention includes a particular way of biasing the variable reluctance wheel speed sensors so that shorts and opens in the sensors and harnesses can be diagnosed. A multiplex circuit is used to direct the outputs of each sensor, in turn, to an input instrumentation amplifier which is used to not only output a signal representing the differential sensor voltage but a common mode signal as well. The common mode signal ideally is constant but sensor shorts and input transients can cause abnormal variations. A window comparator with thresholds bracketing the normal common mode voltage is used to detect such variations. High and low sensor lead voltages must vary over a given range due to wheel movement or open circuit conditions. Open circuit conditions are detected by comparators set at certain thresholds. In each case when thresholds are exceeded, the comparator outputs are timed and a fault is indicated when a comparator time due to a short or an open exceeds a time limit. All of these thresholds and time limits are programmable to optimize the system for a particular application or for special diagnostics at the time of factory testing or servicing.

The output signal of the amplifier is digitized by an analog to digital converter. The signal form the window comparator is fed forward to the converter to stop conversion when the comparator has an output indicative of an aberrant common mode voltage due to either a short or a transient. The A/D converter output remains the same as long as the aberrant voltage is present, thereby avoiding passing on the transients. The A/D output stores the current digital values of the several sensors in separate registers.

A state machine is used to analyze the digital values and convert the nominal sine wave input to square waves. Since the inputs may vary greatly from deal sine waves due to sensor runout or damaged sensor gear teeth, the irregular wave shapes are identified according to peaks and valleys, rather than zero crossings. Peaks and valleys are detected and a square wave edge is identified when the signal passes below a peak (or above a valley) by a hysteresis value. A dual hysteresis method is used to circumvent single cycle anomalies caused by a damaged tooth. Timing circuitry registers the time of occurrence of each edge and counts the number of edges which occur so that the control algorithm can compute wheel speed.

BRIEF DESCRIPTION OF THE DRAWINGS

The above and other advantages of the invention will become more apparent from the following description taken in conjunction with the accompanying drawings wherein like references refer to like parts and wherein:

FIG. 4 is a schematic diagram of the programmable diagnostic circuits and amplifier, according to the invention.

DESCRIPTION OF THE INVENTION

Figure 1:
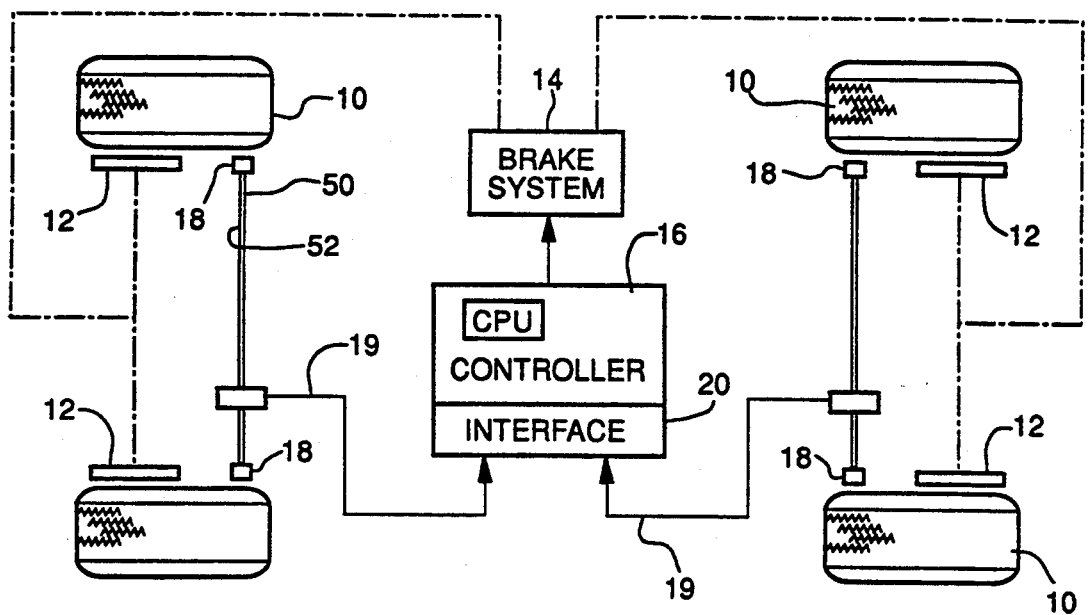
FIG. 1 is a block diagram of an anti-lock brake system according to the invention.

FIG. 1 diagrams an overview of an anti-lock brake system and/or traction control system. Each operates by sensing wheel speed and judiciously applying or releasing brake pressure to attain desired braking performance or traction. Vehicle wheels 10 each have a brake 12 controllably coupled to a brake system 14, which in turn is operated by an electronic controller 16. The controller, including a microprocessor based computer or CPU, resides on a single die or silicon chip. Wheel speed information is provided by conventional gear tooth type variable reluctance sensors 18 which are coupled to the controller 16 through a harness 19 and an interface 20. The harness 19 comprises a high lead and a low lead for each sensor 18 for supplying inputs to the controller.

Figure 2:
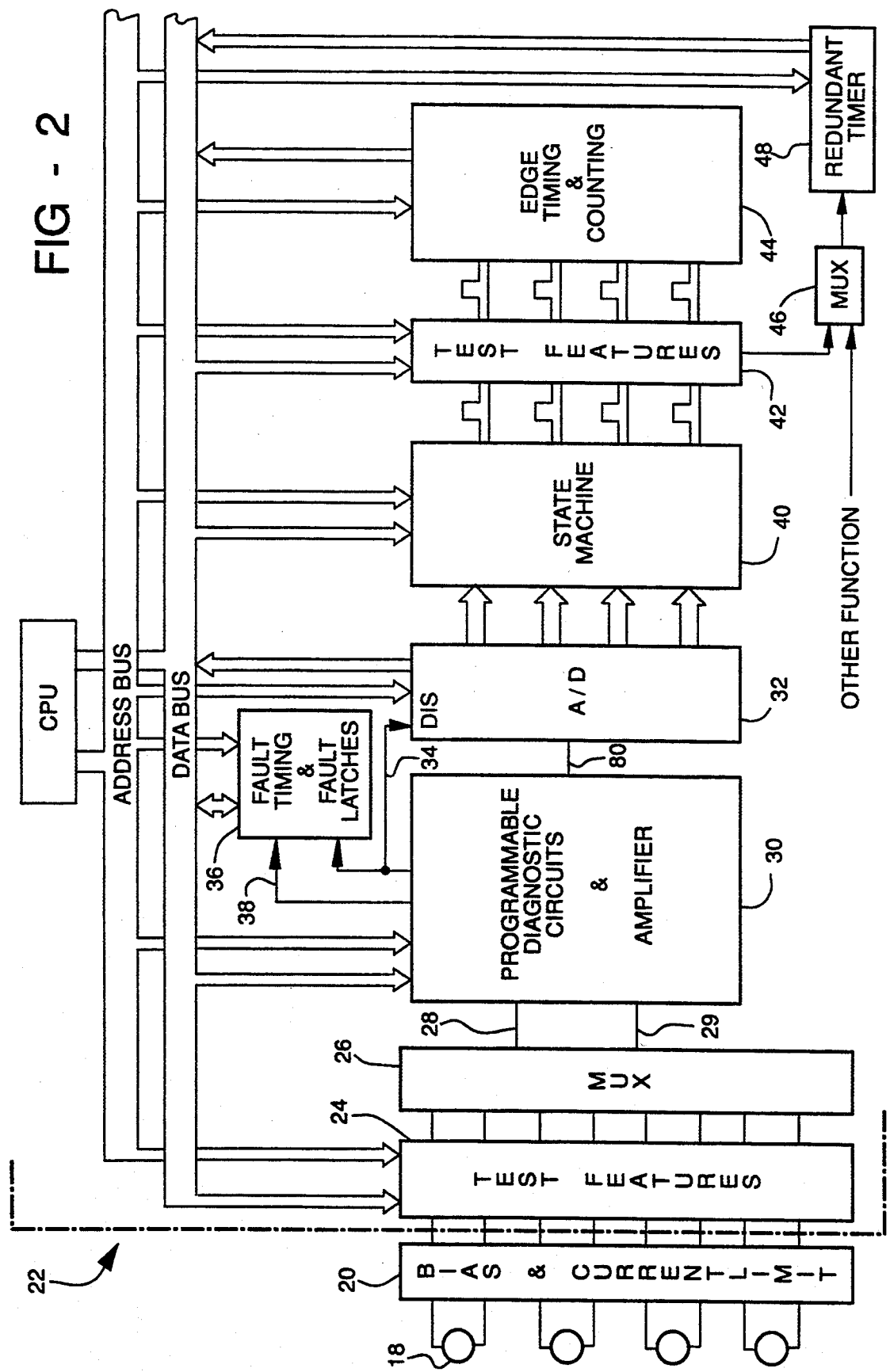
FIG. 2 is a system diagram of the control according to the invention with speed sensor inputs.

In FIG. 2 the interface 20 is labeled as Bias and Current Limit. The variable reluctance sensors 18 and the interface 20 are external of the CPU die. A broken line 22 represents the edge of the die and everything to the right of the broken line is on the die and is coupled to the CPU by an address bus and a data bus.

As further explained below, the interface 20 connects the leads of the sensors 18 to a supply voltage and to ground in a way which facilitates diagnosis of the sensor 18 and harness 19 integrity during vehicle operation. Test features block 24 on the die connects to each sensor lead and enables specific test signals to be imposed on each lead for carrying out diagnostic routines when the vehicle is being serviced. The four sets of sensor leads are multiplexed by MUX 26 to two lines 28 and 29. According to the MUX operation the voltages on the four sets of leads are sequentially applied in separate time frames to the lines 28 and 29 and fed to programmable diagnostic circuits and amplifier 30 which operates on the signals of each time frame independently of the others.

The amplifier of the circuit 30 produced an output representing the differential sensor voltages of the sensors which is fed to an analog to digital (A/D) converter 32. The same amplifier produces a common mode voltage for each sensor which is compared to thresholds by the diagnostic circuits to determine whether shorts occur in any sensor or harness, or whether noise biases the common mode voltage beyond acceptable limits. In either case a lockout line 34 suspends A/D operation to prevent transfer of the aberrant signal to the following stage. The same line triggers a fault timer and latch 36 which latches a short fault signal when a time limit expires. The voltages of each lead are also compared to other thresholds to identify an open circuit condition in the sensor or harness. An open fault signal on line 38 also triggers the fault timer and latch 36 which latches an open fault signal when the open signal persists for a different time period. The thresholds and the time periods are programmable.

The A/D converter 32 samples the analog output of the circuit 30 once each time frame and stores the digital equivalents in a different register (shown in FIG. 4 at 33) for each sensor. A state machine 40 retrieves the samples from the registers and processes them according to an algorithm which converts the nominal sine wave input to digital square waves of the same frequency by a process of seeking peaks and valleys and identifying a square wave edge when the input goes below a peak or above a valley by a hysteresis value.

A programmable test features block 42 normally passes the square waves from the state machine 40 to a timing circuit 44 for registering the time of occurrence of each edge and counting the number of edges which have occurred, so that the control algorithm can compute wheel speed. In test mode, the test features block can select either of two methods of testing the timing circuit 44. According to one test method square waves of known frequency are fed to the timing circuit by the test features block 24 and the CPU determines whether the timing circuit correctly determines the known wheel speed. In another test method the square waves from the state machine 40 are fed to the timing circuit 44 in the usual manner and the test features block 42 also feeds the same square waves via a MUX 46 to a redundant timer 48 which uses a different algorithm to calculate wheel speed; then the CPU makes a comparison of the two calculated wheel speeds to verify the integrity of the timing circuit 44.

Figure 3:
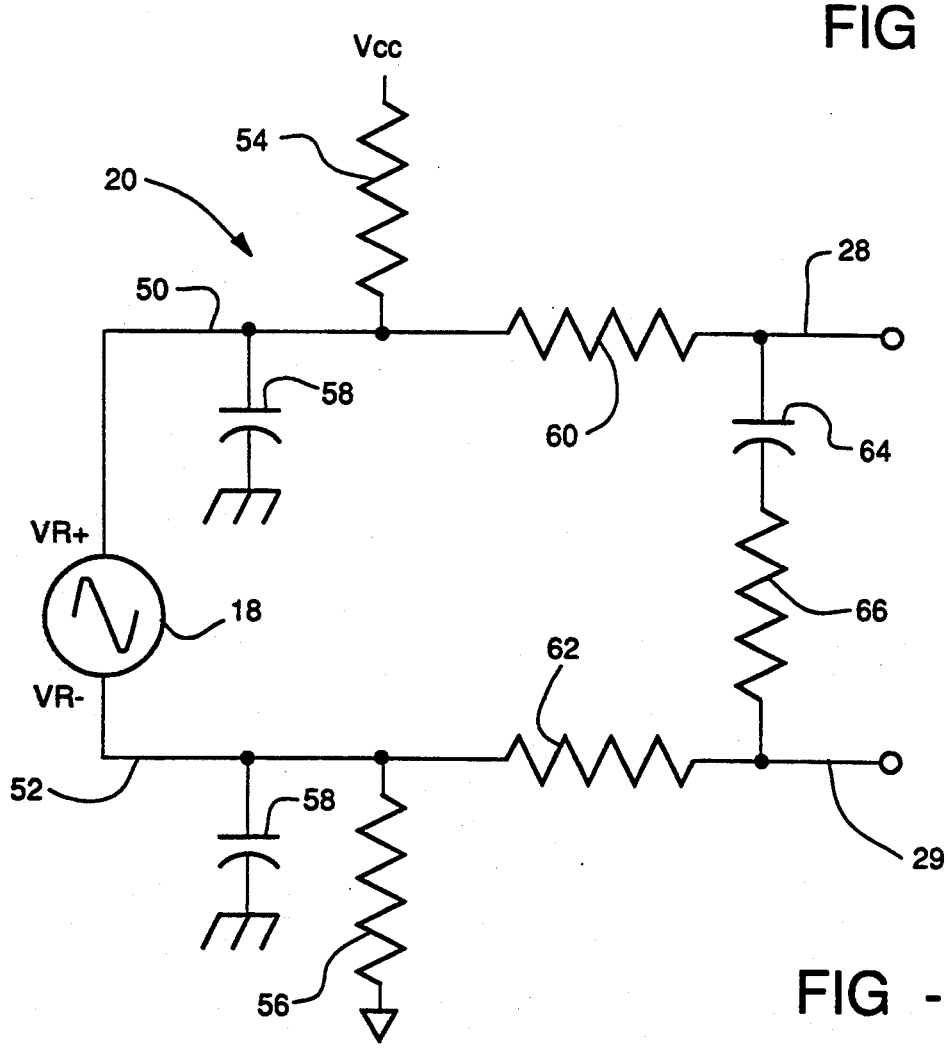
FIG. 3 is a schematic diagram of a sensor biasing circuit useful for diagnostics.

FIG. 3 shows details of the interface 20 and its connection via the leads 50 and 52, which comprise the harness 19, to a variable reluctance sensor 18. A regulated supply voltage Vcc, typically 5 volts, is connected via a bias resistor 54 and a high voltage lead 50 to the high side of the sensor, and the low side is connected through low voltage lead 52 and another bias resistor 56 to ground. The bias resistors are equal and have a value of typically 24 Kohms so that the sensor is biased at Vcc/2. Very small capacitors 58 are connected between the leads 50, 52 and ground for RF decoupling.

A differential filtering circuit comprises resistors 60 and 62 in the leads 50 and 52 to define output leads 28 and 29, respectively, and a capacitor 64 and a resistor 66 serially connected across the leads 28, 29. The resistors 60, 62 each have a value of about 36 Kohms and the resistor 66 is at least 2K. The filter is a lag compensated filter for approximately offsetting the sensor voltage increase with frequency. This allows the DC hysteresis in the squaring circuitry to closely match the processed signal. The filter resistors 60 and 62 also serve a clamp current limiting function. Biasing the sensor by the resistors 54 and 56 allows for open circuit detection. If the sensor leads or the sensor's windings should open, the low voltage output lead 29 will go to its negative clamp voltage and stay there. Likewise, the high lead 28 will go to the positive clamp voltage.

FIG. 4 shows a sensor 18 coupled to the programmable diagnostic circuits and amplifier 30, omitting the filtering circuit of FIG. 3, the test features circuit 24 and the MUX 26. An instrumentation amplifier 72 has two input operational amplifiers 74 and 76, each with one input connected to sensor output lead 28 or 29, and an output operational amplifier 78 having inputs coupled to the amplifiers 74 and 76 and to a positive bias voltage Vref. The output 80 of the amplifier 78 comprises the alternating sensor differential voltage imposed on the voltage Vref which assures that the output will remain in a positive range. Each of the operational amplifiers has a feedback resistor from its output to an input, and a pair of equal gain resistors 82 in series couples inputs of the two input amplifiers 74 and 76. The junction of the resistors 82 is at the common mode voltage Vcm=Vcc/2. Thus the instrument amplifier has not only the differential output but also the common mode output.

FIG. 4 further shows a voltage divider 84 between Vcc and ground with six intermediate voltage taps. Vcc and the three highest taps (e.g. 4.5, 3.5, and 2.75 volts) are coupled to each of a pair of demultiplexers or analog switches 86 and 88, while the three lowest taps (e.g. 0.75, 1.5, and 2.25 volts) and ground are coupled to each of switches 90 and 92. Each of the switches 86–92 has two control inputs 94 responsive to control bits stored in registers by the CPU for selecting which of the input voltages become outputs. The outputs of switches 86 and 90 provide high and low threshold voltages to a window comparator 96. The comparator 96 input is the common mode voltage Vcm from the instrumentation amplifier. The comparator 96 output signifies a short condition and is coupled via line 34 to the fault timing and latching circuit 36 and to the disable function of the A/D converter 32. The output of switch 88 becomes a threshold voltage for a comparator 98 having the sensor high lead voltage on line 28 as its other input. Likewise, the output of switch 92 is a threshold voltage for a comparator 100 which has the sensor low voltage on line 29 as its input. Thus each comparator threshold is programmable, determined by control bits stored in registers. An AND gate 102 has inputs coupled to the comparators 98 and 100 and an output to the fault timing circuit 36 for indicating an open circuit condition. The fault timing circuit has separate timeout settings, both programmable by software, for short and open conditions and latches a fault when a respective open or short condition exceeds its time limit. The range of selectable timeout periods for a short fault is, for example, between 15 and 244 μsec, and the range of timeouts of an open fault is, for example, between 4 and 500 msec. For diagnosing shorts during vehicle operation, the short timeout may be set about 100 μsec.

In operation, the sensor 18 is biased by pulling up the lead 28 to Vcc and pulling down the lead 29 to ground. If the sensor or wire harness becomes open circuited the high lead 28 will go toward Vcc and the low lead 29 will go toward ground and stay there. These lead voltages are monitored by the comparators 98 and 100. When the high lead voltage goes above the comparator 98 threshold and the low lead voltage goes below the comparator 100 threshold, both comparators turn on to sen an open indication to the fault timing circuit 36 via AND gate 102 and the timeout period begins. If the timeout expires an open circuit fault is latched. A variable reluctance sensor output voltage increases with frequency. Since the input may routinely exceed the comparator thresholds for higher frequency and higher voltage inputs, the timing of the open circuit detection must be long enough to eliminate normal high voltage sensor outputs. Low frequency inputs do not have enough voltage to exceed the comparator thresholds. If the sensor has a short to ground or to battery, its common mode voltage Vcm will no longer be Vcc/2. Therefore to detect a short to ground or battery, the window comparator compares Vcm to the high and the low thresholds. If either threshold is violated the output of the window comparator signifies a short condition and the timer for a short condition begins. If the short timeout period expires, a short fault is latched. The probable consequence of latching either fault is that the control system is disabled and a warning message advises the operator to have the vehicle serviced. Prior to latching a fault, a short fault indication on line 34 is fed to the A/D converter to prevent digitizing the differential signal on line 80.

The programmability of the thresholds and the times has a number of advantages. An open sensor may not necessarily be infinite resistance and a short is not always zero ohms. Thus there is a decision to be made as to what constitutes a fault, and this may depend on the circumstances. For example, if a sensor harness has an extra 2 Kohms to 3 Kohms resistance when the vehicle is assembled, it is probably a problem, but if the vehicle is quite old, it probably is not a problem. Thus for initial testing of a new vehicle the programmable fault thresholds and timeout periods should be set for tight tolerances to discover any latent defect and avoid customer dissatisfaction. If a service technician is trying to find a harness problem, the ability to program the parameters through a diagnostic computer will allow him to discover whether to look for a hard short or perhaps a corroded connection. When the vehicle is in service, the parameters should be set to nominal values to adequately diagnose the harness/sensor system without undue sensitivity.

The output of the instrumentation amplifier 72 on line 80 is the differential of the input leads provided that the input signals stay within their input common mode range. If the inputs stray outside the common mode range the simplifier's output can not be predicted. That is, the amplifier may have an output other than the input differential. Such a problem occurs when a common mode pulse is induced on the sensor leads, perhaps by a current spike in a conductor near the leads. Then a spike will appear in the output on line 80. Such a common mode pulse, if passed through the system to the wave squaring circuit, could produce extraneous edges. The extraneous edges will, of course, generate false wheel speed information. The diagnostic circuit described above is used to lock out such a common mode pulse. The window comparator is not limited to detecting shorts, rather it detects any signal aberration which causes the common mode voltage to violate either threshold. Thus the common mode pulse is detected by the window comparator 96 to produce an output on line 34 which is coupled to the A/D converter 32. The A/D converter responds to the signal by suspending digital conversion of the line 80 voltage and maintaining the digital output which existed in the corresponding register 33 prior to the common mode pulse.

While the present invention has been described in reference to the illustrated embodiment, it will be understood that the scope of the invention is limited only by the appended claims.

What is claimed is:

1. Apparatus for detecting faulty operation of a wheel speed sensor which develops cyclic output signals on first and second output leads thereof, comprising:

means for establishing upper and lower voltage potentials;

bias means including a first resistor coupling the first output lead to said upper voltage potential, and a second resistor coupling the second output lead to said lower voltage potential;

measurement means including a voltage divider coupling said first and second output leads for measuring a voltage intermediate the output signals on said first and second output leads;

a window comparator for comparing said measured voltage with first and second threshold voltages defining a range of voltages within which said measured voltage lies during normal operation of said wheel speed sensor; and means for producing a first abnormal operation signal indicative of a possible short circuit condition of said wheel speed sensor when said measured voltage is outside the range of voltages defined by said first and second threshold voltages.

2. The apparatus of claim 1, further comprising:

reference generating means for defining a plurality of selectable reference voltages; and computer controlled means connected to said reference generating means for selecting the first and second threshold voltages of said window comparator form among said plurality of selectable reference voltages.

3. The apparatus of claim 1, wherein a short circuit fault condition is indicated when said first abnormal operation signal is produced for at least a first time interval.

4. The apparatus of claim 1, further comprising:
means for comparing the output signal on said first output lead with a third threshold voltage;
means for comparing the output signal on said second output lead with a fourth threshold voltage; and
means for producing a second abnormal operation signal indicative of a possible open circuit condition of said wheel speed sensor when said the output signal on said first output lead exceeds said third voltage and the output signal on said second output lead exceeds said fourth threshold voltage.

5. The apparatus of claim 4, wherein an open circuit fault condition is indicated when said second abnormal operation signal is produced for at least a second time interval.

6. The apparatus of claim 1, further comprising:
means for measuring a differential voltage according to a difference between the output signals on said first and second output leads;
a digital utilization circuit; and
an analog to digital conversion circuit for generating digital representations of the measured differential voltage for said digital utilization circuit, such conversion circuit including lockout means responsive to said first abnormal operation signal for suspending conversion so long as said first abnormal operation signal is produced.

7. A method for detecting faulty operation of a wheel speed sensor which develops cyclic output signals on first and second output leads thereof, when the first output lead is coupled to an upper voltage potential through a first resistor, and the second output lead is coupled to a lower voltage potential through a second resistor the method of comprising the steps of:
measuring a voltage intermediate the output signals on said first and second output leads;
comparing said measured voltage with first and second threshold voltages defining a range of voltages within which said measured voltage lies during normal operation of said wheel speed sensor; and
producing a first abnormal operation signal indicative of a possible short circuit condition of said wheel speed sensor when said measured voltage is outside said range of voltages defined by said first and second threshold voltages.

8. The method of claim 7, further including the steps of:
measuring a differential voltage according to a difference between the output signals on said first and second output leads;
converting said measured differential voltage to a digital signal for application to a digital utilization circuit; and
suspending conversion of said measured differential voltage so long as said first abnormal operation signal is produced.

9. The method of claim 7, further including the steps of:
setting a first time limit; and
indicating a short circuit fault condition of said wheel speed sensor when said first abnormal operation signal is produced for at least said first time limit.

10. The method of claim 7, further including the steps of:
comparing the output signal on said first output lead with a third threshold voltage;
comparing the output signal on said second output lead with a fourth threshold voltage; and
producing a second abnormal operation signal indicative of a possible open circuit condition of said wheel speed sensor when said the output signal on said first output lead exceeds said third threshold voltage and the output signal on said second output lead exceeds said fourth threshold voltage.

11. The method of claim 10, further including the steps of:
setting a second time limit; and
indicating an open circuit fault condition of said wheel speed sensor when said second abnormal operation signal is produced for at least said second time limit.

* * * * *